United States Patent [19]

Muto et al.

[11] 3,841,593
[45] Oct. 15, 1974

[54] SUPPORTING STRUCTURE FOR PRESSURE VESSEL FOR NUCLEAR REACTORS

[75] Inventors: Kiyoshi Muto; Toshihiko Hisada, both of Tokyo, Japan

[73] Assignee: Kajima Corporation, Tokyo, Japan

[22] Filed: July 28, 1972

[21] Appl. No.: 276,258

[30] Foreign Application Priority Data
Jan. 19, 1972 Japan.................. 47-6921

[52] U.S. Cl...................... 248/146, 52/224, 176/87
[51] Int. Cl.............................................. G21c 13/08
[58] Field of Search ......... 248/146, DIG. 1; 52/224, 52/227, 167, 249, 292; 176/87

[56] References Cited
UNITED STATES PATENTS

| | | |
|---|---|---|
| 3,397,503 | 8/1968 | Adler................................... 52/224 |
| 3,589,088 | 6/1971 | Seidl..................................... 52/224 |
| 3,683,574 | 8/1972 | Vaessen................................ 52/224 |

*Primary Examiner*—Marion Parsons, Jr.
*Attorney, Agent, or Firm*—Oldham & Oldham Co.

[57] ABSTRACT

A cylindrical supporting structure is connected integrally with a prestressed concrete pressure vessel for a nuclear reactor for supporting the pressure vessel thereon. The supporting structure is formed with a plurality of circumferential slits or separating surfaces to be divided into a plurality of concentric cylindrical elements so as to minimize the horizontal shearing stress produced mainly due to the thermal expansion of the vessel. Further, a plurality of radial slits or separating surfaces may be provided in the concentric cylindrical elements so as to minimize the circumferential tensile stress appearing in the cylindrical elements.

10 Claims, 5 Drawing Figures

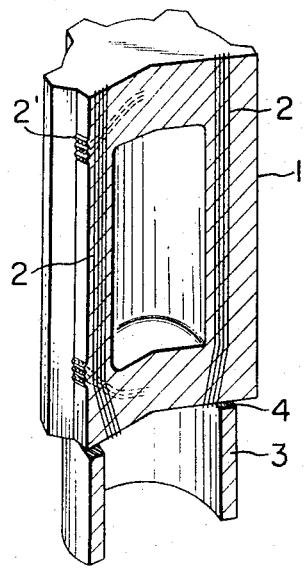
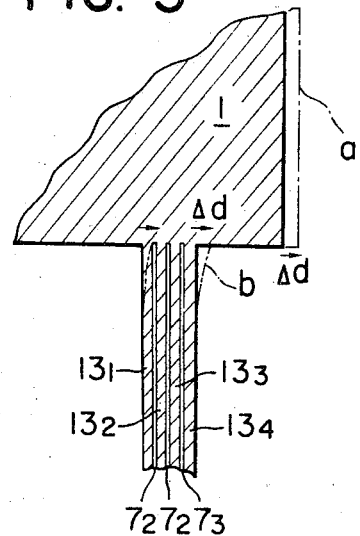
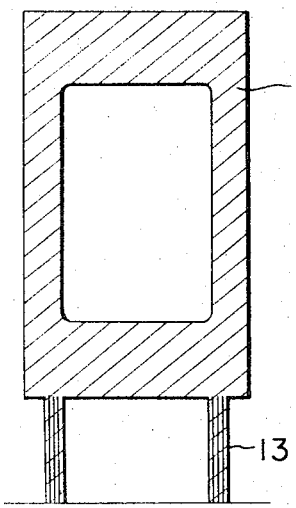
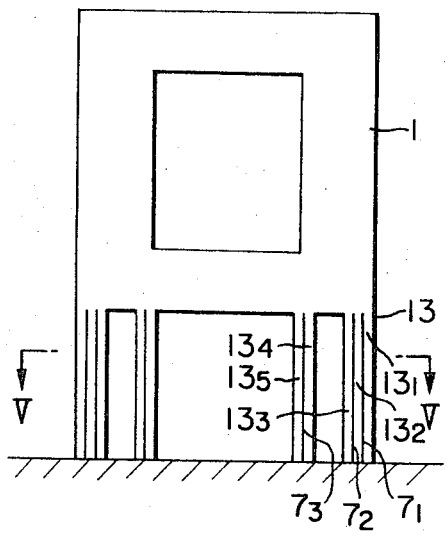
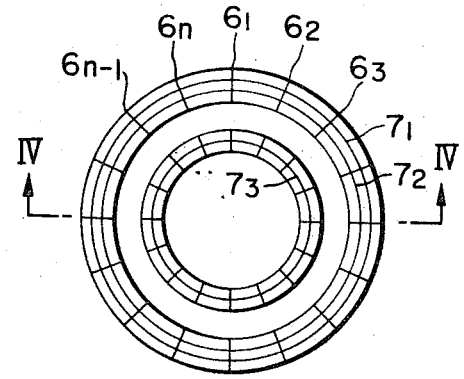

SUPPORTING STRUCTURE FOR PRESSURE VESSEL FOR NUCLEAR REACTORS

This invention relates to a supporting structure for vessels or containers subjected to relatively large temperature differences between their inner and outer sides, and more particularly to a structure for supporting a prestressed concrete pressure vessel for nuclear power reactors.

Heretofore, a prestressed concrete pressure vessel of the kind above described has been supported by, for example, a cylindrical structure of high-strength reinforced concrete commonly called a support ring or support skirt disposed beneath the pressure vessel. This structure is employed in, for example, the nuclear power reactor erected at Fort St. Vrain in the United States of America. By virtue of the cylindrical shape, this supporting structure is advantageous in that it possesses a high mechanical strength and a space or chamber can be formed beneath the pressure vessel. However, in a country such as Japan in which earthquakes occur frequently, and therefore, careful consideration must be given to the resistance to earthquakes, the conventional arrangement in which the pressure vessel is not connected with the supporting structure monolithicaly therefor is unfaivorable when employed in that form. Further, careful consideration must also be given in reactor design in view of the fact that a large horizontal shearing force appears at the joint portion between the pressure vessel and the cylindrical supporting structure.

More precisely, referring to FIG. 1 showing one form of the conventional arrangement, a prestressed concrete pressure vessel 1 which is commonly called PCPV is shown supported on a cylindrical supporting structure 3 with a supporting plate 4 of elastic material interposed therebetween. This pressure vessel 1 is prestressed in the vertical and horizontal or circumferential directions by means of a plurality PS tendons 2 and 2', although parts of these tendons are merely shown in FIG. 1 for the sake of simplicity.

This pressure vessel 1 has, for example, a total height of the order of 30 meters, an outer diameter of the order of 19 meters, an interior height of the order of 23 meters and an inner diameter of the order of 9 meters. Although not shown in FIG. 1, conduits extend through or openings are provided in the thick concrete wall to serve the requirements for the proper performance of the reactor, and cooling fluid circulating piping is installed on the surface of the concrete wall for controlling the temperature of the concrete wall. The difference between the temperatures at the inner and outer surfaces of the concrete wall is maintained at about 60°C by the cooling fluid and insulation material, and this means that the concrete wall is subjected to heat whose mean temperature difference is about 30°C. Thus, the thermal expansion of the pressure vessel having the dimensions above described causes an elongation which is considerably large for concrete.

The interposition of the elastic supporting plate 4 between the pressure vessel 1 and the cylindrical supporting structure 3 of high-strength reinforced concrete is undesirable from the viewpoint of the resistance to earthquakes. It is therefore desirable to construct the pressure vessel 1 and the cylindrical supporting structure 3 of high-strength reinforced concrete as an integral unit. However, with such a construction the elongation due to the thermal expansion creates a radial bending moment, a horizontal shearing force and a circumferential tensile force in the upper joint portion of the cylindrical supporting structure 3. The supporting structure 3 may easily yield or collapse when a seismic force is imparted thereto in the state in which a large bending stress and shearing stress are present already in the supporting structure 3.

With a view to solving the above problem, it is an object of the present invention to provide a novel and improved cylindrical supporting structure for a reactor pressure vessel in which a plurality of substantially equally radially spaced circumferential slits or separating surfaces are provided to divide the supporting structure into a plurality of concentric cylindrical elements for reducing the bending and the shearing force by thermal expansion.

Another object of the present invention is to provide a cylindrical supporting structure of the above character in which a plurality of substantially equally circumferentially spaced radial slits or separating surfaces are provided in the concentric cylindrical elements so that the cylindrical supporting structure can possess a sufficient rigidity and mechanical strength for withstanding a seismic force.

The above and other objects, features and advantages of the present invention will be apparent from the following description taken in conjunction with the accompanying drawing.

FIG. 1 is a partly cut-away perspective view showing schematically the conventional combination of the reactor pressure vessel and the cylindrical supporting structure described previously.

FIG. 2 is a schematic vertical section of a pressure vessel supported by a supporting structure in an embodiment of the present invention.

FIG. 3 is an enlarged vertical section showing in detail parts of the joint portion between the pressure vessel and the supporting structure shown in FIG. 2.

FIG. 4 is a schematic vertical section of a pressure vessel supported by a supporting structure in another embodiment of the present invention, the section being taken on the line IV — IV in FIG. 5.

FIG. 5 is a cross section taken on the line V — V in FIG. 4.

Referring now to FIGS. 2 and 3 showing an embodiment of the present invention, a pressure vessel 1 is supported by a cylindrical supporting structure 13 of high-strength reinforced concrete which is an integral extension of the pressure vessel 1. This cylindrical supporting structure 13 differs from that shown in FIG. 1 in that it consists of a plurality of concentric cylindrical elements $13_1$, $13_2$, $13_3$ and $13_4$ which are substantially equally spaced from each other by circumferential slits $7_1$, $7_2$, and $7_3$ as best shown in FIG. 3. It will be seen from FIG. 3 that each individual cylindrical element has a wall thickness which is about one fourth the wall thickness of the prior art cylindrical supporting structure shown in FIG. 1. The division of the supporting structure 13 into a plurality of cylindrical elements each having a small wall thickness is advantageous in that the geometrical moment of inertia can there by be remarkably reduced since the geometrical moment of inertia is proportional to the third power of the thickness. Further, due to the fact that the bending moment is proportional to this geometrical moment of inertia, in the case of thermal expansion, the bending moment of each individual cylindrical element can be remarkably reduced so that the cylindrical supporting structure 13 can be easily deformed or deflected as shown by $b$ in FIG. 3 to follow the radial elongation $\Delta d$, as shown by $a$ in FIG. 3, of the pressure vessel 1 due to the thermal expansion caused by the temperature gradient thereacross described previously. This arrangement, therefore, minimizes vertical bending stress and the horizontal shearing stress which tends to appear at the upper portion of the supporting structure when the supporting structure is constructed as an integral part of the pressure vessel, and anyone skilled in the art can suitably design so that any excessive stress may not appear in the joint portion between the pressure vessel and the supporting structure even when encountered with an earthquake.

While the cylindrical supporting structure consisting of four concentric cylindrical elements has been illustrated in FIGS. 2 and 3 by way of example, it is apparent that the number and the depth of the cylindrical elements may be suitably selected depending on design requirements.

Further, the space between the concentric cylindrical elements may be filled with any suitable material which may not impart any substantial resistance to the deflection of the cylindrical elements although such space forms an air gap in the illustrated example. Also, the slits can be substituted by suitable metal sheets, at least one surface of each sheet being treated by a smoothing agent such as silicon oil for providing a separating surface thereat.

Furthermore, the upper portion of the supporting structure which is deflected in the manner above described may be heated by any suitable heating means so that the upper part of supporting structure may expand radially and follow to the thermal expansion of the pressure vessel.

In another embodiment of the present invention shown in FIGS. 4 and 5, in which like reference numerals are used to denote like parts appearing in FIGS. 2 and 3, a pressure vessel 1 is supported by a cylindrical supporting structure 13 of high-strength reinforced concrete which is similarly an integral extension of the pressure vessel 1. In this embodiment, the cylindrical supporting structure 13 consists of a first group of concentric cylindrical elements $13_1$, $13_2$ and $13_3$ substantially equally spaced from each other by circumferential slits $7_1$ and $7_2$ and a second group of concentric cylindrical elements $13_4$ and $13_5$ spaced from each other by a circumferential slit $7_3$ as shown. While this supporting structure 13 is broadly divided into two groups as shown so as to meet the demand for providing an intermediate space or chamber between these groups, the division into two groups is in no way the essential condition. This arrangement provides the same advantage as that described with reference to the preceding embodiment so that the cylindrical supporting structure 13 can be easily deformed or deflected to follow the radial elongation $\Delta d$ of the pressure vessel 1 due to the thermal expansion caused by the temperature gradient thereacross.

While the division of the cylindrical supporting structure 13 into a plurality of concentric cylindrical elements in the manner above described is advantageous in minimizing the vertical and bending stress and the horizontal shearing stress, the continuity of each individual cylindrical element in the circumferential direction may give rise to a drawback. More precisely, the radial elongation $\Delta d$ of the pressure vessel results in an elongation of the cylindrical elements in the circumferential direction, and a tensile stress will appear in the circumferential direction of the cylindrical elements. Then suitable means is required to minimize this undesirable stress. To this end, a plurality of substantially equally spaced radial slits $6_1$ to $6_2$ are preferably provided in the cylindrical elements $13_1$ to $13_5$ as seen in FIG. 5 so as to absorb the circumferential elongation of the cylindrical elements and minimize the circumferential tensile stress. Thus, the cylindrical supporting structure 13 can easily follow the thermal expansion of the pressure vessel 1 in spite of the fact that it is an integral part of the pressure vessel 1.

It will be understood that the above arrangement minimizes the undesirable circumferential tensile stress which tends to appear at the upper portion of the cylindrical supporting structure 13 when the supporting structure is constructed integrally with the pressure vessel, and anyone skilled in the art can suitably design so that any excessive stress may not appear in the joint portion between the pressure vessel and the supporting structure even when encountered with an earthquake.

While a cylindrical supporting structure having all the slits extending to the lower end portion thereof has been illustrated in FIGS. 4 and 5 by way of example, it may be advantageous in some cases that such slits, especially the radial slits $6_1$ to $6_n$ are limited to extend through the upper portion only of the supporting structure. Further, although the radial slits are shown registered with each other in all the concentric cylindrical elements, it may be advantageous that the radial slits in one of the cylindrical elements is staggered by half pitch from those in the adjacent cylindrical element as required.

While two preferred embodiments of the present invention have been described by way of example, the present invention is in no way limited to such specific embodiments and many changes and modifications may be made therein without departing from the spirit of the present invention.

What is claimed is:

1. A cylindrical supporting structure connected integrally with the lower portion of a prestressed concrete pressure vessel for a nuclear reactor for supporting said pressure vessel thereon, comprising a plurality of substantially equally radially spaced circumferential separations extending through a substantial portion of said cylindrical supporting structure for dividing same into a plurality of relatively movable concentric cylindrical elements.

2. A cylindrical supporting structure as claimed in claim 1, comprising further a plurality of substantially equally circumferentially spaced radial separations extending through at least the upper portion of said concentric cylindrical elements.

3. A cylindrical supporting structure as claimed in claim 2, in which the radial separations in all said concentric cylindrical elements register with each other.

4. A cylindrical supporting structure as in claim 2 where the wall of such structure is smaller in radial length than the wall of the reactor and where said circumferential separations terminate at the connection of the structure to the reactor.

5. A cylindrical supporting structure as claimed in claim 1, in which said concentric cylindrical elements are divided into at least two groups for defining a chamber therebetween.

6. A cylindrical supporting structure as claimed in claim 1, wherein said separations are air gaps.

7. A cylindrical supporting structure as claimed in claim 6, wherein said air gaps are filled with a material which not impart any substantial resistance to the deflection of said cylindrical elements.

8. A cylindrical supporting structure as claimed in claim 1, wherein the upper portion of the supporting structure is heated to follow the thermal expansion of pressure vessel.

9. A cylindrical supporting structure as in claim 1 wherein said circumferential separations terminate at the connection of the structure to the reactor.

10. A cylindrical supporting structure as claimed in claim 1, where said circumferential separations extend the length of the supporting structure.

* * * * *